2,937,175
PREPARATION OF OROTIC ACID

Igor Scriabine, Lyon, France, assignor to Societe des Usines Chimiques Rhone-Poulenc, Paris, France, a French body corporate No Drawing. Application December 31, 1956
Serial No. 631,430

Claims priority, application France January 18, 1956

4 Claims. (Cl. 260—260)

This invention is for improvements in or relating to the production of orotic acid.

Orotic acid (or 4-uracilcarboxylic acid) is arousing more and more interest since it has become known that it plays an important biological role as a growth factor. One of the conventional syntheses of orotic acid is that of Muller [J. prakt. Chemie, 56, 488 (1897)] and Behrend and Struve (Ann. Chemie, 378, 165), which consists in condensing urea with the diethyl diester of oxalacetic acid, that is to say, the compound

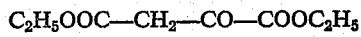

$$C_2H_5OOC-CH_2-CO-COOC_2H_5$$

(which will hereinafter be called "neutral oxalacetic ester"), and then subjecting the product obtained to an alkaline hydrolysis at elevated temperature to form the alkali salt of orotic acid, from which the free acid is liberated by the addition of an acid.

A number of authors have subsequently studied this synthesis, more especially Mitchell and Nyc [J. Am. Chem. Soc. 69, 674 (1947)], but it has not hitherto been found possible to obtain orotic acid yields higher than about 30%.

It is the object of the present invention to provide a new and improved process for the production of orotic acid.

The process of the present invention comprises condensing urea in the presence of methanol with an oxalacetic monoester, that is to say, a compound of the type ROOC—CH₂—CO—COOH, where R is an organic radical such as an alkyl group (which will hereinafter be called "acid oxalacetic ester"). This reaction gives a condensation product which is insoluble in the reaction medium and which, when treated with an alkali, is converted into an alkali salt of orotic acid, from which it can thereafter readily be converted into the free orotic acid.

Instead of using an acid oxalacetic ester as starting material, it is also possible to start with a diester of oxalacetic acid which is converted into an acid oxalacetic ester, by partial saponification, whereafter the product is condensed in situ with urea in the presence of methanol without isolating the said acid oxalacetic ester from the reaction mixture. After alkaline treatment followed by acidification, orotic acid is obtained in yields higher than 50%.

The use of ethyl esters (neutral or acid) of oxalacetic acid is at present preferred merely because they are the most readily obtainable commercially. It is to be understood, however, that the use of other esters of oxalacetic acid equally falls within the scope of the present invention.

The following examples illustrate the present invention. Except where otherwise indicated, the parts given are parts by weight. When they are given by volume, they correspond to the parts by weight in the same ratio as cubic centimetres to grammes.

Example I 4 parts of monoethyl ester of oxalacetic acid (prepared in accordance with Wislicenus, Ann. Chemie, 246, 323), 3 parts of urea and 25 parts by volume of methanol are mixed together. After 48 hours at room temperature, the insoluble condensation product formed is collected, washed with boiling methanol and dried. 5.3 parts of product are obtained, which are then treated for 20 hours at a temperature of 24–26° C. with 53 parts by volume of 2 N sodium hydroxide. The mixture maintained at about 0° C. is then made acid with hydrochloric acid. Orotic acid, which is precipitated, is filtered off by means of suction, washed and dried at 60° C. 3.5 parts of orotic acid monohydrate are obtained, which represents a yield of 80.5% calculated on the acid oxalacetic ester employed.

Example II

As described in the preceding example, urea and monoethyl ester of oxalacetic acid are condensed together. The condensation product (5.3 parts) is then treated at boiling point for 20 minutes with 50 parts by volume of N potassium hydroxide, and the reaction mixture is made acid. 3.4 parts of orotic acid are obtained, which represents a yield of 78%.

Example III

Into a spherical glass flask provided with a thermometer, a reflux condenser, an agitator and pouring funnel are introduced 440 parts of the sodium derivative of neutral oxalacetic ester (96% technical product) and 2000 parts by volume of methanol. The mixture is heated on the water bath until a solution is formed, which is then cooled at a temperature of 40° C. 376 parts by volume of a 5.33 N solution of sodium hydroxide in methanol are then added over a period of 1 hour 40 minutes. The temperature automatically remains at 40–42° C. and a precipitate is formed. When the addition is complete the mixture is agitated for 4 hours, the temperature being maintained at 40° C. by heating on a water bath. The product is then cooled and 750 parts by volume of a 5.36 N solution of hydrochloric acid in methanol are introduced over a period of 35 minutes, the temperature being maintained below 25° C.

200 parts of urea in solution in 600 parts by volume of methanol are then added, and the mixture is allowed to stand for 48 hours at room temperature. A first fraction of the condensation product is precipitated mixed with sodium chloride. It is filtered off by means of suction and washed with 300 parts by volume of methanol. After drying at 60° C., 422 parts are obtained. By successive concentrations of the mother liquors, a second and a third fraction (96 parts in all) are obtained, which are combined with the first fraction. Thus, a total of 518 parts of a mixture of condensation product and sodium chloride are obtained.

This mixture is introduced into a spherical glass flask provided with an agitator. 2400 parts of water and 400 parts by volume of sodium hydroxide solution (36° Bé.) are added at 25° C., and the mixture is agitated until the solid material is completely dissolved, which takes about 1 hour. The solution is then left overnight at room temperature; 2 parts of decolourising charcoal are then added and the mixture is filtered. The filtrate is rapidly run on to a mixture of 600 parts of ice and 500 parts by volume of hydrochloric acid (22° Bé.) which causes orotic acid to be precipitated and is left for a further 8 hours at 15–20° C. to complete the precipitation. The orotic acid is then filtered off by means of suction and washed with distilled water. After drying at 80° C., 186 parts of orotic acid monohydrate are obtained, M.P. 332° C. The yield on the sodium derivative of the neutral oxalacetic ester is 53.5%.

The orotic acid thus obtained is cream in colour. It can be decolourised by redissolving it in dilute sodium hydroxide and treating the solution with a little potassium permanganate. After filtration and precipitation by means of ice and hydrochloric acid, as previously described, a substantially white orotic acid melting at 334° C. is obtained in practically quantitative yield.

It is obvious that the foregoing examples are purely illustrative and that modifications, for example, of the duration or the temperature of the reaction and the concentration of the reactants may be made.

I claim:

1. A process for the preparation of orotic acid, which comprises mixing urea and a monoester of oxalacetic acid of the formula R—OOC.CH$_2$CO.COOH, where R represents a lower alkyl radical, in the presence of methanol, leaving the mixture to stand whereby a condensation product is formed, adding an alkali metal hydroxide to the condensation product to form an alkali metal salt of orotic acid and thereafter adding a strong inorganic acid.

2. A process for the preparation of orotic acid, which comprises mixing urea and a monoethylester of oxalacetic acid of the formula C$_2$H$_5$—OOC.CH$_2$CO.COOH in the presence of methanol, leaving the mixture to stand whereby a condensation product is formed, adding an alkali metal hydroxide to the condensation product to form an alkali metal salt of orotic acid and thereafter adding a strong inorganic acid.

3. A process for the preparation of orotic acid, which comprises mixing urea and a monoester of oxalacetic acid of the formula R—OOC—CH$_2$CO—COOH, where R represents a lower alkyl radical, prepared in situ by the partial saponification of a corresponding diester of oxalacetic acid, in the presence of methanol, leaving the mixture to stand whereby a condensation product is formed, adding an alkali metal hydroxide to the condensation product to form an alkali metal salt of orotic acid and thereafter adding a strong inorganic acid.

4. A process for the preparation of orotic acid, which comprises mixing urea and a monoethylester of oxalacetic acid of the formula $$C_2H_5—OOC—CH_2—CO—COOH$$

prepared in situ by the partial saponification of the diethylester of oxalacetic acid, in the presence of methanol, leaving the mixture to stand whereby a condensation product is formed, adding an alkali metal hydroxide to the condensation product to form an alkali metal salt of orotic acid and thereafter adding a strong inorganic acid.

References Cited in the file of this patent

Mitchell et al.: Jour. Amer. Chem. Soc., vol. 69, pp. 674–7 (1947).

Vanderhaeghe: Bull. Soc. Chim., Belg., vol. 62, pp. 611–8 (1953).

Wheeler et al:. Am. Chem. J., vol. 38, pp. 358–366 (1907).

Behrend et al.: Ann. der Chemie, vol. 378, pp. 165–6 (1910).

Wheeler et al.: Am. Chem. J., vol. 37, pp. 392–405 (1907).

Bachstez: Ber. Deut. Chem., vol. 63, pp. 1000–1007 (1930).